United States Patent
Bishop et al.

(10) Patent No.: US 7,254,697 B2
(45) Date of Patent: Aug. 7, 2007

(54) METHOD AND APPARATUS FOR DYNAMIC MODIFICATION OF MICROPROCESSOR INSTRUCTION GROUP AT DISPATCH

(75) Inventors: James Wilson Bishop, Leander, TX (US); Hung Qui Le, Austin, TX (US); Jafar Nahidi, Round Rock, TX (US); Dung Quoc Nguyen, Austin, TX (US); Brian William Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 11/055,831

(22) Filed: Feb. 11, 2005

(65) Prior Publication Data

US 2006/0184768 A1    Aug. 17, 2006

(51) Int. Cl.
*G06F 9/38* (2006.01)

(52) U.S. Cl. .................. 712/213; 712/24; 712/216

(58) Field of Classification Search ............... 712/24, 712/213, 216

See application file for complete search history.

(56) References Cited

U.S. PATENT DOCUMENTS

| | | | |
|---|---|---|---|
| 6,658,551 B1 * | 12/2003 | Berenbaum et al. | 712/24 |
| 6,665,791 B1 * | 12/2003 | Berenbaum et al. | 712/24 |
| 6,880,074 B2 * | 4/2005 | Perry et al. | 712/248 |
| 7,007,153 B1 * | 2/2006 | Berenbaum et al. | 712/24 |
| 7,096,343 B1 * | 8/2006 | Berenbaum et al. | 712/24 |

\* cited by examiner

*Primary Examiner*—William M. Treat
(74) *Attorney, Agent, or Firm*—Diana Roberts-Gerhardt, Esq; Synnestvedt & Lechner LLP

(57) ABSTRACT

Dynamic reformatting of a dispatch group by selective activation of inactive Start bits of instructions within the dispatch group at the time the instructions are read from the IBUF. The number of instructions in the reformatted dispatch groups can vary from as few as one instruction per group to a maximum number of instructions read from the IBUF per cycle. The reformatted dispatch groupings can be terminated after a single cycle, or they can remain reformatted for as many cycles as desired, depending upon need.

14 Claims, 4 Drawing Sheets

METHOD AND APPARATUS FOR DYNAMIC MODIFICATION OF MICROPROCESSOR INSTRUCTION GROUP AT DISPATCH

BACKGROUND OF THE INVENTION

1. Field of the Invention

The present invention generally relates to computer systems, and more particularly to an improved method and apparatus for dispatching program instructions in a processor.

2. Description of the Related Art

High-performance computer systems use multiple processors to carry out the various program instructions embodied in computer programs such as software applications and operating systems. A typical multi-processor system 10 is shown in FIG. 1. Computer system 10 has one or more processing units arranged in one or more processor groups; in the depicted system, there are four processing units 12a, 12b, 12c, and 12d in processor group 14. The processing units communicate with other components of system 10 via a system or fabric bus 16. Fabric bus 16 is connected to a system memory 20, and various peripheral devices 22.

Service processors 18a, 18b are connected to processing units 12 via a JTAG interface or other external service port. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. PCI host bridge 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the Power5™ processor marketed by International Business Machines Corp., which comprises a single integrated circuit superscalar microprocessor having various execution units (fixed-point units, floating-point units, and load/store units), registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b may include an on-board (L1) cache (typically separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, i.e., a second level (L2) cache 28 which, along with a memory controller 30, supports both of the L1 caches that are respectively part of cores 26a and 26b. Additional cache levels may be provided, such as an L3 cache 32 which is accessible via fabric bus 16.

Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board or similar field replaceable unit (FRU), which can be easily swapped installed in or swapped out of system 10 in a modular fashion.

In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied. Within a pipeline superscalar processor, instructions are first fetched, decoded and then buffered. Instructions can be dispatched to execution units as resources and operands become available. Additionally, instructions can be fetched and dispatched speculatively based on predictions about branches taken.

The result is a pool of instructions in varying stages of execution, none of which have completed by writing final results to the system memory hierarchy. As resources become available and branches are resolved, the instructions are retired in program order, thus preserving the appearance of a machine that executes the instructions in program order. Overall instruction throughput can be further improved by modifying the hardware within the processor, for example, by having multiple execution units in a single processor core.

Another technique known as hardware multithreading can be used to independently execute smaller sequences of instructions called threads or contexts. When a processor, for any of a number of reasons, stalls and cannot continue processing or executing one of these threads, the processor can switch to another thread. The term "multithreading" as used by those skilled in the art of computer processor architecture is not the same as the software use of the term in which one task is subdivided into multiple related threads. Software multithreading substantially involves the operating system which manipulates and saves data from registers to main memory and maintains the program order of related and dependent instructions before a thread switch can occur.

Software multithreading does not require nor is it concerned with hardware multithreading and vice versa. Hardware multithreading manipulates hardware-architected registers, execution units and pipelined processors to maintain the state of one or more independently executing sets of instructions (threads) in the processor hardware.

Hardware threads could be derived from, for example, different tasks in a multitasking system, different threads compiled from a software multithreading system, or from different I/O processors. In each example of hardware multithreading, more than one thread can be independently maintained in a processor's registers.

Simultaneous multithreading (SMT) is a processor design that combines hardware multithreading with superscalar processor technology to allow multiple threads to issue instructions each cycle. Unlike other hardware multi-threaded architectures in which only a single hardware context (i.e., thread) is active on any given cycle, SMT permits all thread contexts to simultaneously compete for and share processor resources. Also, unlike conventional superscalar processors, which suffer from a lack of per-thread instruction-level parallelism (ILP), simultaneous multithreading uses multiple threads to compensate for low single-thread ILP. The performance consequence is significantly higher instruction throughput and program speedups on a variety of workloads that include commercial databases, web servers and scientific applications in both multi-programmed and parallel environments.

There are still some performance disadvantages with SMT processing. In a typical SMT processor, two threads cannot be dispatched in the same cycle due to timing and complexity. In other words, one thread, and only that thread, can be dispatched in a given cycle, so another thread vying for resources must wait for its turn to be dispatched. If the dispatching thread cannot use up all resources (e.g., execution units), then one or more execution units may sit idle because the dispatching thread does not have enough instructions to feed all execution units. For example, if there were two fixed-point units (FXUs) and two load/store units (LSUs) in the processor, and if the dispatching thread only had two fixed-point instructions to be dispatched, then the two LSUs would sit idle for one cycle while the two FXUs are executing the instructions. This inefficiency can create bottlenecks in the processor, and lower overall processing throughput of the system.

To solve this problem, an improved method of handling instructions in an SMT processor was developed so as to increase the effective dispatching bandwidth. This method, as well as an improved processor to perform the method, is disclosed and claimed in commonly assigned, co-pending application Ser. No. 10/965,143, filed on Oct. 14, 2004, incorporated fully herein by reference. In accordance with this improved method, prior to loading the instructions into the Instruction Cache (referred to herein as the ICache), the instructions are pre-decoded by inserting Start bits on each instruction, and then delineating the end of a first grouping and the beginning of the next grouping of instructions by activating the Start bit for the instruction that begins the next grouping. During the pre-decode process, a Start bit is placed on the first instruction of the group, such that all instructions in the group can be dispatched together.

Instructions that cannot be dispatched together must be placed in different groups. Examples of instructions that cannot be dispatched together in the same group include instructions that are dependent upon on each other, or situations where there are more unit-specific instructions than there are units to do the processing (e.g., if there are only two FXU units, but three FXU instructions, then two 2 FXU instructions can be in the same group, and the third FXU instruction must go to the next group). In the prior art, once the instructions are grouped, there is no provision made for changing the grouping without going back to the pre-decode process and regrouping the instructions.

In an SMT environment, instructions from both threads can be read out of the instruction buffers (IBUFs) simultaneously, and both threads can be dispatched together if there is no resource conflict between the two threads, e.g., if there are a sufficient number of execution units to handle both groups in their entirety. If there are resource conflicts, then the higher priority thread is allowed to dispatch its group while the lower priority thread is stalled, waiting to be dispatched when the conflict no longer exists. Thus the lower priority thread does not make forward progress as quickly as it would if it did not have to wait for the priority thread.

As an example, assume a system in which there are seven execution units to process instructions, and there are two IBUFs, each able to hold up to five instructions. If the first IBUF has a high-priority thread comprising three instructions, and the second IBUF has a low-priority thread comprising five instructions, the first IBUF will be read and processed completely before allowing the second IBUF to be read and processed, even though the thread in the first IBUF will only be using 3 of the seven available execution units. This is wasteful of available resources and causes unnecessary delays in processing.

Accordingly, it would be desirable to devise an improved method of handling instructions in a processor whereby instruction groupings could be modified dynamically during the IBUF read process, i.e., while the instructions are in the process of being dispatched.

SUMMARY OF THE INVENTION

The present invention enables dynamic reformatting of a dispatch group by selective activation of inactive Start bits of instructions within the dispatch group at the time the instructions are read from the IBUF. The number of instructions in the reformatted dispatch groups can vary from as few as one instruction per group to a maximum number of instructions equal to the number instructions read from the IBUF per cycle. The reformatted dispatch groupings can be terminated after a single cycle, or they can remain reformatted for as many cycles as desired, depending upon need.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE PREFERRED EMBODIMENTS

Figure 1:
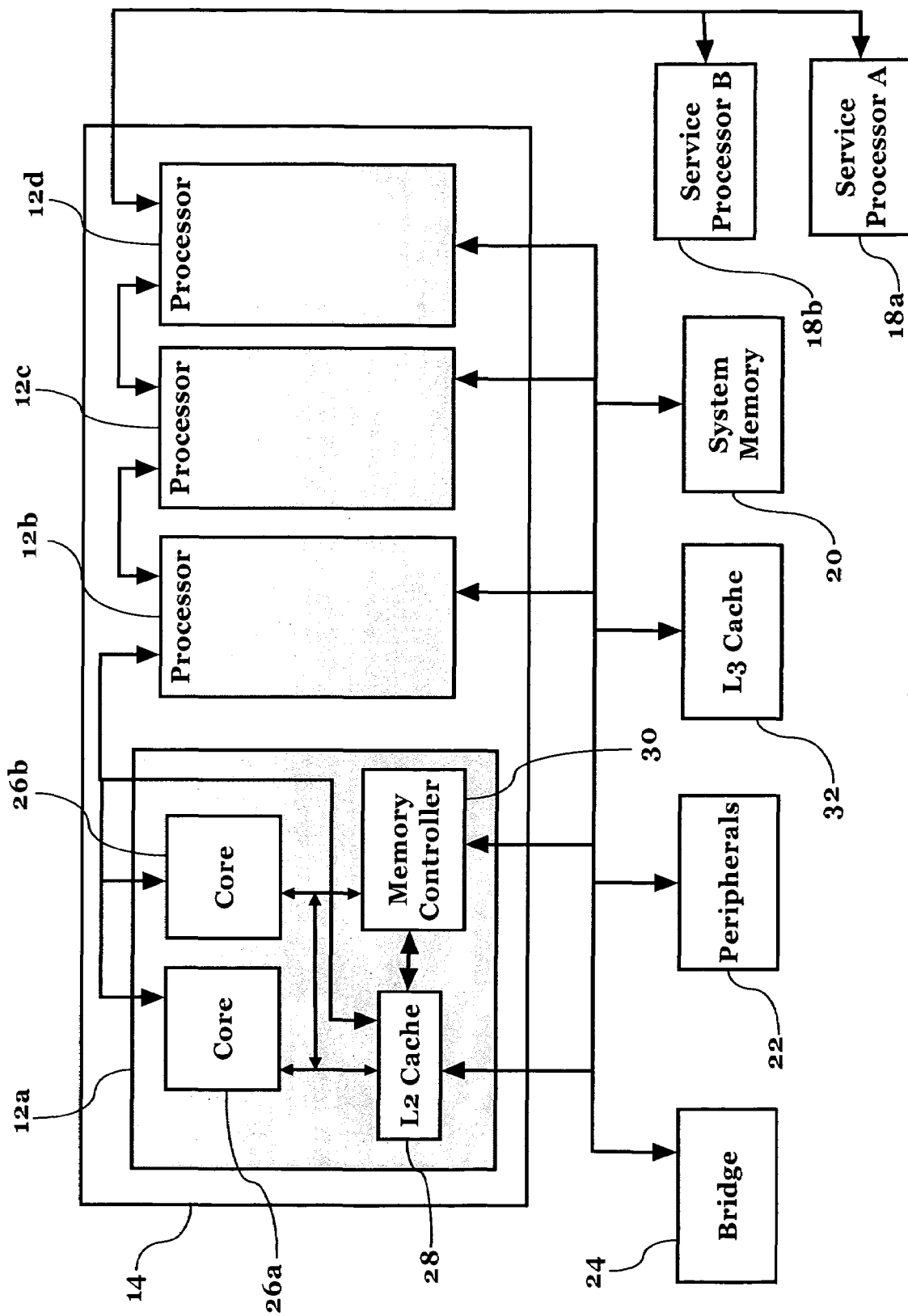
FIG. 1 is a block diagram depicting a conventional symmetric multi-processor (SMP) computer system, with internal details shown for one of the four generally identical processing units.
Figure 2:
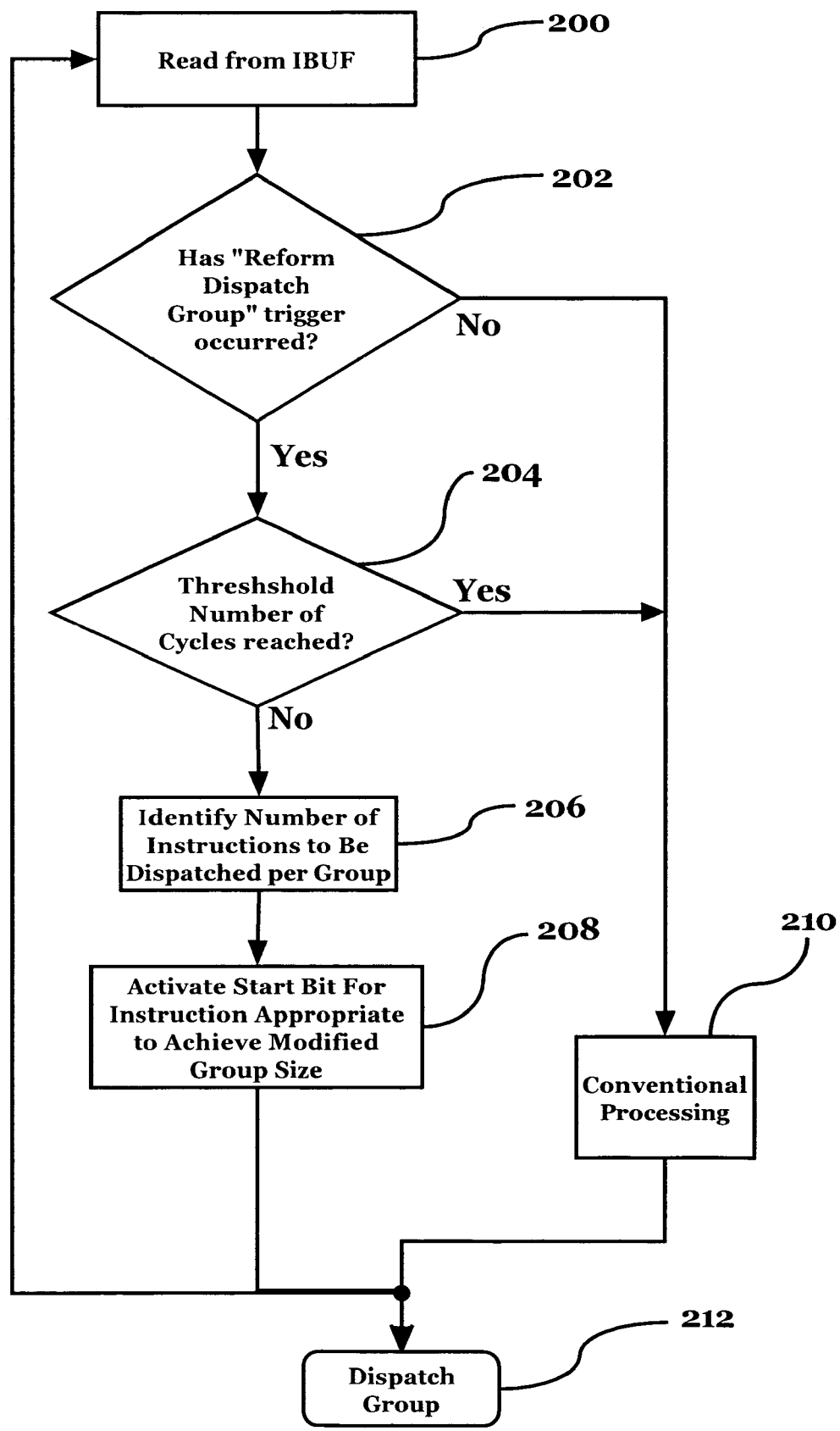
FIG. 2 is a flowchart illustrating the basic process steps performed in accordance with the present invention.

FIG. 2 is a flowchart illustrating the general concept of the present invention, in the form of process steps. Referring to FIG. 2, at step 200, the read process for reading the instructions, already grouped using prior art methods, commences. As is known, this begins the dispatching of the instructions according to their groupings, with the groupings being defined by the positioning of the active Start bits.

At step 202, a determination is made as to whether or not any of the predetermined "reformat dispatch group" triggers have occurred. Described in more detail below, these triggers may include the occurrence of a Load/Store Unit (LSU) reject event; the detection of a particular code stream that indicates the desirability of maximizing throughput; the detection of a thread that is not making forward progress, etc.

If no trigger has occurred, the process proceeds to step 210, where the dispatch group is processed according to normal procedures, i.e., the dispatch group is unmodified and is used in the same format as when it was originally placed in the IBUF. However, if it is determined that a "reformat dispatch group" trigger has occurred, then the process proceeds to step 204. Step 204 determines if the threshold number of cycles of the triggering event has been reached or not. This allows the reformatted grouping to continue for as few or as many cycles as desired. If the threshold number of cycles has been reached, then the process proceeds to step 210, where the dispatch group is processed according to normal procedures, i.e., the dispatch group is unmodified and is used in the same format as when it was originally placed in the IBUF. If the threshold number of cycles has not been reached, then the process proceeds to step 206, where the number of instructions to be included in the reformatted dispatch group is identified. For example, in the LSU reject scenario mentioned above, it may be desirable to slow down the dispatch rate to one instruction per group, until the LSU reject condition clears up, i.e., in this situation, the number of instructions to be included in the reformatted dispatch group would be 1.

At step 208, the appropriate Start bit within the existing grouping is activated to achieve the modified (reformatted) group size. Thus, for example, if the current dispatch group comprises 5 instructions, and it is determined to reformat the dispatch group to be one instruction per group, then the Start bit for the second instruction is activated, which indicates that a new grouping is beginning after the first instruction, i.e., the grouping being dispatched in the next cycle is now one instruction in size. When the IBUF refreshes to replace the one instruction dispatched, the Start bit for the second instruction (the former second instruction having moved into the first position after the dispatch) is set to "active", and the process continues.

The processed group from either step 208 or 210 is dispatched in step 212. After the dispatch group is processed in either step 208 or 210, the process goes back to the IBUF at 200 to read new instructions and continue the process.

Figure 3:
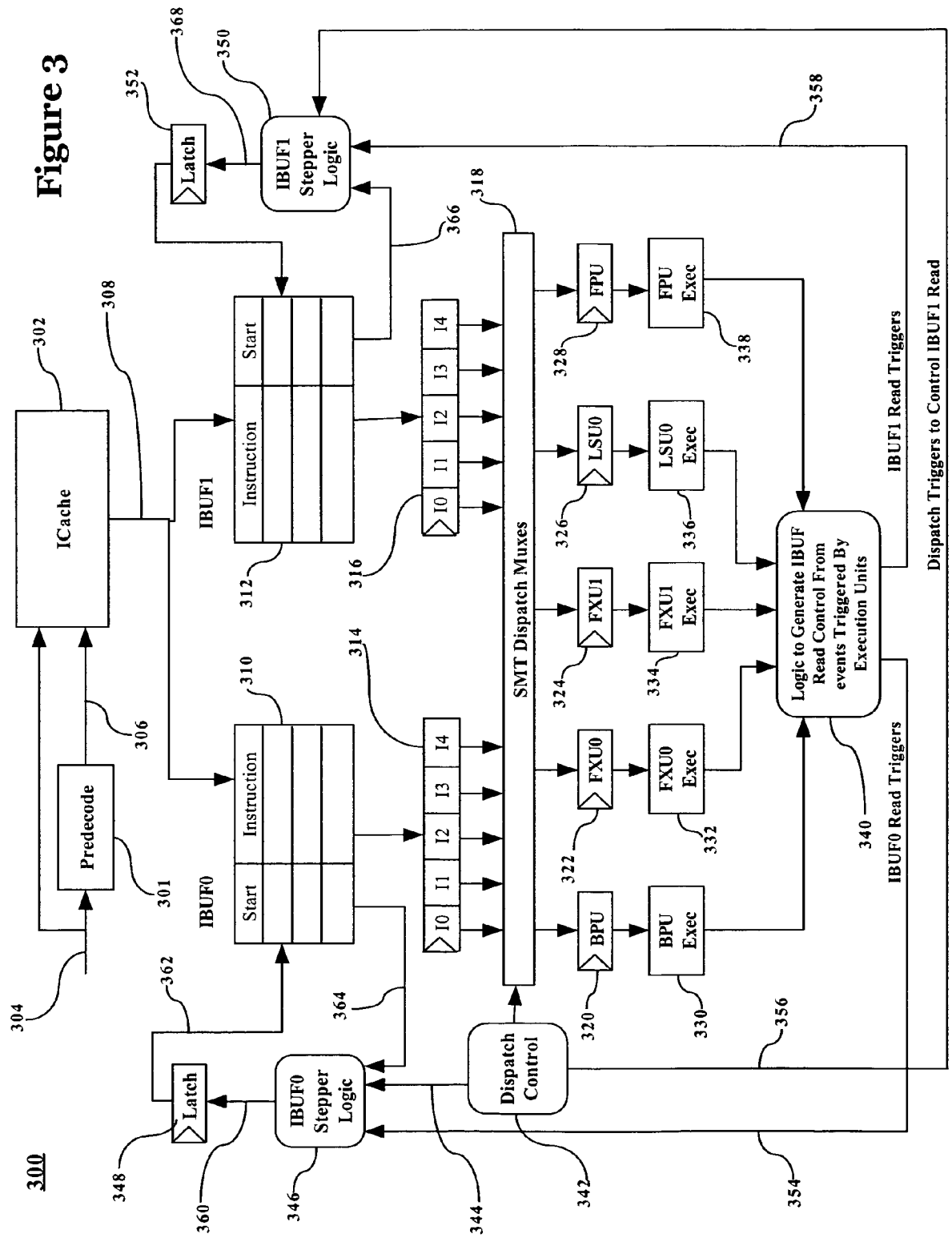
FIG. 3 is a block diagram illustrating the dataflow to support dispatching of instructions in a reformatted grouping mode in accordance with one embodiment of the present invention.

With reference now to FIG. 3, there is depicted one embodiment 300 of a computer processor constructed in accordance with the present invention. Processor 300 is generally comprised of a single integrated circuit superscalar microprocessor, and includes various execution units, registers, buffers, memories, and other functional units (explained further below), which are all formed by integrated circuitry. Processor 300 may operate according to reduced instruction set computing (RISC) techniques. The interconnection of the various elements of processor 300 is accomplished using well-known elements (e.g., system or fabric busses and bus interface units) which are not described further herein. Those skilled in the art will appreciate that the present invention is not limited to the specific construction shown in FIG. 3, as some components may be omitted, other components may be added, or different interconnections provided while still affording the novel functionality disclosed herein.

The execution circuitry of processor 300 has multiple execution units for executing sequential instructions, including fixed-point units (FXUs) 332 and 334, load-store units (LSUs) 336, floating-point units (FPUs) 338, and other branch processing units (BPUs) 330. These execution units 330, 332, 334, 336, and 338 execute one or more instructions of a particular type of sequential instructions during each processor cycle. For example, FXUs 332 and 334 perform fixed-point mathematical and logical operations such as addition, subtraction, ANDing, ORing, and XORing, utilizing source operands received from specified general purpose registers (not shown) in a known manner.

FPU 338 performs single and double-precision floating-point arithmetic and logical operations, such as floating-point multiplication and division, on source operands received from floating-point registers (not shown). LSU 336 executes floating-point and fixed-point instructions, and BPU 330 performs condition code manipulation instructions and branch instructions. Following the execution of their various instructions, the execution units output the data results of the instruction to logic 340, which logic generates IBUF read-control from events triggered by the execution units. This refers to the ability of the execution units to slow down their execution throughput—for example, if the LSU is encountering something in the cache such that it is desirable to only dispatch one instruction at a time in all pipes. The FXU units can do the same thing—for example, if the FXU is detecting that it cannot handle 2 FXU instructions from the same thread at the same time, it can request that a single instruction group be formed such that only 1 FXU instruction is dispatched for that thread. Overheating is another example of a condition which might militate the reformatting of the dispatch group; each execution unit can be configured to signal that it is heating up, and that it needs the chip to slow down to give the silicon a chance to cool off. A request can be made to slow the processing down for a predetermined time period, e.g., to no more than 2 instructions per dispatch group, so that the chip can cool down.

Processor 300 may employ both pipelining and out-of-order execution of instructions to further improve the performance of its superscalar architecture. Accordingly, instructions can be executed by the execution units in any order as long as data dependencies are observed. In addition, instructions may be processed by each of the execution units at a sequence of pipeline stages, in particular, five distinct pipeline stages: fetch, decode/dispatch, execute, finish, and completion.

In the illustrative embodiment, processor 300 uses simultaneous multithreading (SMT) to enhance processor throughput, by allowing multiple threads to issue different instructions each cycle. Hardware multithreading may be implemented in processor 300 in a variety of forms, such as coarse-grained multithreading (executing one thread until the executing thread experiences a long latency event, e.g., retrieving data and/or instructions from memory, a processor interrupt, etc.) or fine-grained multithreading (interleaving or switching threads on a cycle-by-cycle basis). In general, processor 300 uses simultaneous hardware multithreading to maintain N threads, or N states, in parallel in the processor and simultaneously execute N threads in parallel. Processor registers may be replicated for each of the N threads' results in some of the following registers (replicated N times): general purpose registers, floating point registers, condition registers, floating point status and control registers, count registers, link registers, exception registers, save/restore registers, special purpose registers, etc. Special buffers such as a segment look-aside buffer may be replicated but if not, each entry can be tagged with the thread number and flushed on every thread switch. Also, some branch prediction mechanisms, e.g., the correlation register and the return stack, may also be replicated. Not all of the processor's features need be replicated for each thread and there may be some shared and some replicated registers and/or there may be some separate parallel stages in the pipeline or there may be other shared stages of the pipeline. There is no need to replicate certain higher-level functions of the processor such as the caches, instruction buffer, store queue, instruction dispatcher, functional or execution units, pipelines, translation look-aside buffer (TLB), or branch history table.

The present invention is advantageously implemented in an SMT processor design to enable dynamic adjustment of the dispatching bandwidth, by enhancing the manner in which instructions are read from the IBUFs and dispatched to the various execution units.

Instructions from the L2 cache are examined by a predecode circuit 301 which generates the Start bits for each instruction, and this information is written, with the instructions, into ICache 302. At fetch time, the instructions and Start bits for those instructions are sent to an instruction buffer (IBUF) to store the instructions for dispatch. In SMT mode, there is one IBUF per thread; in the example of FIG. 3, there are two threads to be executed in SMT mode, "thread0", which is queued in IBUF0 (element 310), and "thread1", which is queued in IBUF1 (element 312). At any given time, one thread will have higher dispatching authority (the primary thread), and the other thread will have lower dispatching authority (the secondary thread).

In the example of FIG. 3, it is assumed that five instructions are read out of the IBUFs per clock cycle, five from IBUF0 to dispatch latches 314, and five from IBUF1 to dispatch latches 316. When the instructions are read out of the IBUFs for dispatching, the Start bits are also read out (364, 366). The Start bits are then examined to determine which instruction terminates the current dispatch group (346, 350). A new IBUF read pointer is calculated each cycle based on the current Start bit value. The newly calculated IBUF read pointers are latched in latches 348, 352 to be used in the following clock cycle. For example, if the read pointer is on location N of the IBUF, and if there is only one active Start bit in the group (i.e., the Start bit is active on the first instruction in the group by default, and the other four instructions have inactive Start bits), then the five instructions can be dispatched together, and the read pointer is incremented to N+5 to read the next five instructions out of the IBUF in the next clock cycle. However, if the Start bit is active on the first instruction, and the Start bit is also active in the second instruction, then the Start bit on the second instruction terminates the dispatch group such that only the first instruction is in a group by itself, and the read pointer is incremented to N+1 for the next IBUF read. Similarly, if the Start bit is active on the first instruction, the Start bit is inactive for the second instruction, and the Start bit is active in the third instruction, then the Start bit on the third instruction terminates the dispatch group such that only the first instruction and the second instruction are in the same dispatch group. For this case, the read pointer is incremented to N+2 to read out the next group in the following clock cycle.

Dispatch control 342 examines the resource bits from both threads and selects the instructions eligible for dispatching from the dispatch registers 314, 316. The SMT dispatch multiplexer 318 selects instructions to be dispatched to the receiving latches of the execution units such as the Branch Processing Unit (BPU) 320, FXU0 332, FXU1 334, LSU0 326, and FPU 328. At the execution stages, the BPU execution engine 330, FXU0 execution engine 332, FXU1 execution engine 334, LSU0 execution engine 336, and FPU execution engine 338 can detect events that cause the dispatch to slow down. These triggering events are sent to the logic block 340 to generate requests to the IBUFs 356, 358 to cause the IBUF read to reformat the instruction groups through the IBUFs stepper logic 346, 350. The IBUF stepper logic 346, 350 will reformat the instruction group, and recalculate the new IBUF read address. The recalculated IBUF read addresses are latched in latches 348, 352 to be used in the next following clock cycle to read the IBUFs 310, 312.

In addition, the dispatch control detects certain events at the dispatch stage and sends its own triggers 344, 356 to the IBUFs stepper logic to reformat the instruction group. For example, the dispatch control can detect that one thread has not been able to make forward progress due to excessive blocking by the other thread. The dispatch control can send a trigger to the IBUFs to break up their dispatch group into smaller groups so that the stalling thread may be partially dispatched and make forward progress.

Figure 4:
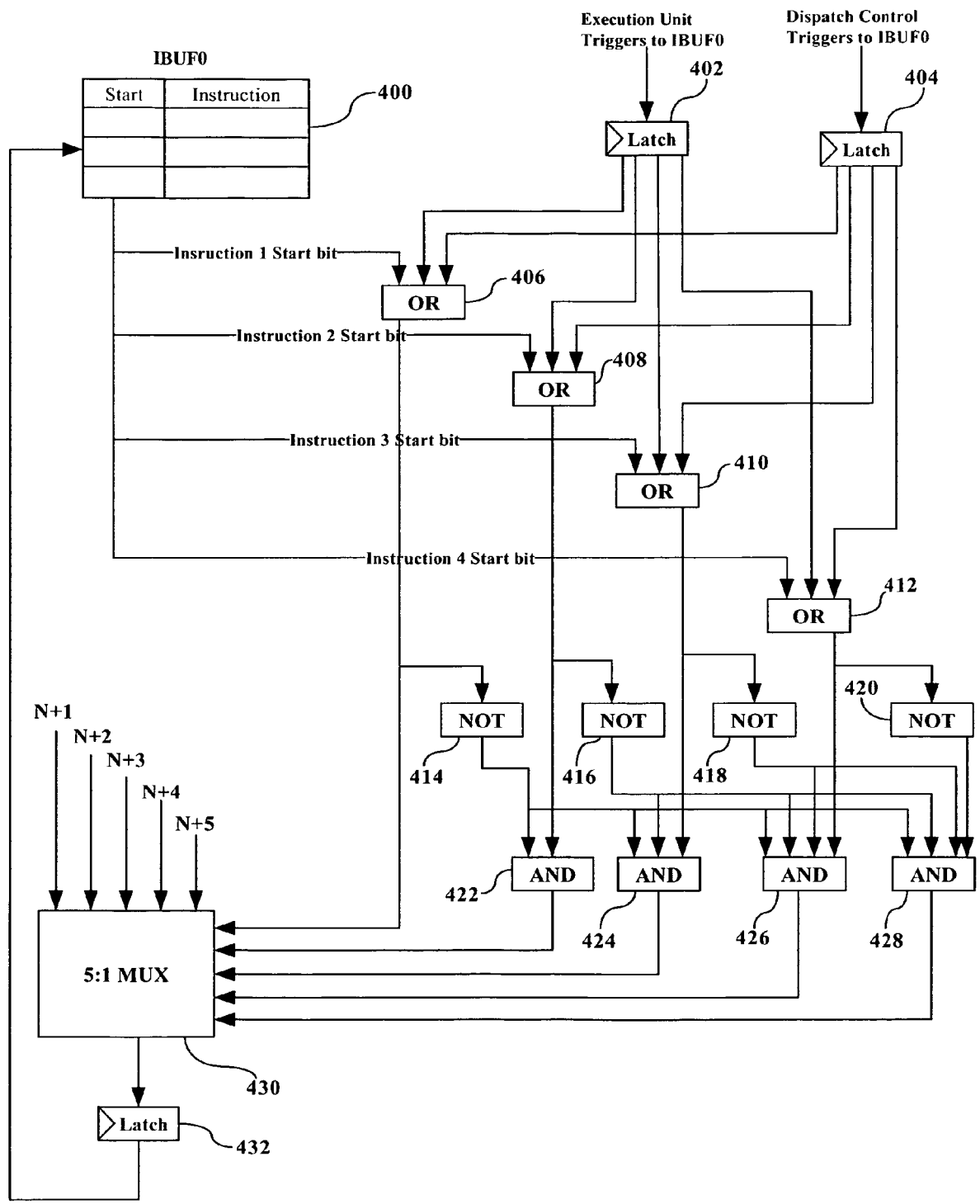
FIG. 4 is a chart depicting the logical flow for dispatching program instructions in accordance with one implementation of the present invention.

FIG. 4 is a logic diagram illustrating how sensed downstream events can change the IBUF read pointer such that the dispatch group can be formed dynamically to have only one instruction in the group, or a maximum of 2, 3, or 4 instructions in the group (as well as the conventional 5 instructions). The triggering events can stay active for one cycle, or stay active for as many additional cycles as desired to allow a finer granularity of control, i.e., instead of just turning on a triggering event and keep it active indefinitely, the execution unit controls the grouping type (1 instruction per group, 2 instructions per group, etc.) for a period of time. They execution units can change the grouping type at any time.

One example of a downstream event that might trigger a reformatting of the dispatch group dynamically can come from the LSU. If the LSU is detecting that the prefetch engine is causing the L2 cache to thrash due to a large number of outstanding prefetch requests, it can trigger the dispatch control to slow down the dispatch of instructions to one instruction group per cycle until the thrashing condition disappears. When the thrashing condition disappears, the LSU can drop the trigger, and the dispatcher will resume full dispatch again.

Another example can occur with respect to SMT dispatch. During SMT dispatch, the higher priority thread can consume more available resources, and starve the lower priority thread. If thread 0 has a higher priority, and it has a stream of fixed-point unit (FXU) and LSU instructions in the same dispatch groups, and thread 1 (the lower priority thread), also has a stream of FXU and LSU instructions, then thread 0 may consume all available dispatch resources and cause thread 1 to starve. This starving condition can be detected by the dispatcher to feed back to the IBUF read control a request to throttle down the dispatch rate of thread 0. Thread 0 can then be put into a reduced instruction group mode for a number of cycles to allow thread 1 to make forward progress. Once the starving condition disappears, then the trigger can be deactivated so that full dispatch can be resumed for thread 0.

Another possible application of this invention is to allow the microprocessor to have a range of performance based on the machine types to be sold to each market. For a low-end market, the microprocessor can be programmed to run only in single instruction mode; thus, for this type of machine, the performance is reduced along with a reduction of power usage. For a higher end machine, the microprocessors can be programmed to allow dispatch of a maximum of two, three, or four instructions per group, thereby offering a variety of performance levels. A maximum of five instructions per dispatch group can be reserved for the highest performance machine. In other words, use of the present invention allows for a variety of external triggers to throttle down dispatch levels based on either hardware or software feedback mechanisms.

As shown in FIG. 4, if a downstream trigger 402,404 requires or requests that the IBUF to slow down and dispatch only one instruction per group, then the Start bit is forced to become active on the second instruction in the group by the OR gate 406 so that the next IBUF 400 location read will be N+1 as selected by the multiplexer 430. If the Start bit is already active from the ICache, then this action is redundant for this group. However, the next instruction group will go through the same process if the triggering event is still active in the next clock cycle.

If the downstream event needs the IBUF to slow down and dispatch a maximum of two instructions per group, then the Start bit is forced to become active on the third instruction in the group by the OR gate 408 so that the next IBUF 400 location read will be N+2, as selected by the multiplexer 430, if the Start bit for the second instruction in the group is inactive as performed by the NOT gate 414 and the AND gate 422. If the Start bit of the second instruction is already active from the ICache, then the next IBUF location read will be N+1 instead. If the Start bit of the second instruction is inactive, and the Start bit of the third instruction is active, then this action is redundant for this group, and the next IBUF location read will be N+2.

If the downstream event 402,404 needs the IBUF to slow down and dispatch a maximum of three instructions per group, then the Start bit is forced to become active on the fourth instruction in the group by the OR gate 410 so that the next IBUF 400 location read will be N+3, as selected by the multiplexer 430, if the Start bit for the second and third instructions in the group are inactive as performed by the NOT gate 414, NOT gate 416 and the AND gate 424. If the Start bit of the second instruction is already active from the ICache, then the next IBUF location read will be N+1 instead. If the Start bit of the second instruction is inactive, and the Start bit of the third instruction is active, then the next IBUF location will be N+2. If the Start bit of the second and third instructions are inactive, and the Start bit of the fourth instruction is active, then the action is redundant for this group, and the next IBUF location read will be N+3.

If the downstream event 402,404 needs the IBUF to slow down and dispatch a maximum of four instructions per group, then the Start bit is forced to become active on the fifth instruction in the group by the OR gate 412 so that the next IBUF 400 location read will be N+4 as selected by the multiplexer 430, if the Start bits for the second, third, and fourth instructions in the group are inactive as performed by the NOT gate 414, NOT gate 416, NOT gate 418 and AND gate 426. If the Start bit of the second instruction is already active from the ICache, then the next IBUF location read will be N+1 instead. If the Start bit of the second instruction is inactive, and the Start bit of the third instruction is active, then the next IBUF location will be N+2. If the Start bits of the second and third instructions are inactive and the Start bit of the fourth instruction is active, then the next IBUF location read will be N+3. If the Start bits of the second, third, and fourth instructions are inactive, and the Start bit of the fifth instruction is active, then this action is redundant for this group, and the next IBUF location read will be N+4.

If there is no downstream event detected that would indicate a need to slow down the dispatch, and if the Start bits of the second, third, and fourth instructions are inactive, and the Start bit of the fifth instruction is active, then next IBUF location read will be N+4 as performed by the NOT gate 414, NOT gate 416, NOT gate 418, NOT gate 420 and the AND gate 428.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as a processor configured in accordance with the present invention. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-4 support combinations of means for performing the specified functions, combinations of steps for performing the specified functions, and program instruction means for performing the specified functions.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention is particularly adapted for high-end multiprocessor computer systems, it is also usable in single processor systems. It is therefore contemplated that such modifications can be made without departing from the spirit or scope of the present invention as defined in the appended claims.

We claim:

1. A method of handling instructions in a computer processor, comprising:

reading a dispatch group of program instructions from an Instruction Buffer (IBUF), said dispatch group comprising a first predetermined number of program instructions, said dispatch group being predecoded prior to being read into said IBUF wherein said predecoding comprises the insertion of an inactive Start bit in each of said program instructions in said dispatch group, and activating one of said inactive Start bits to define the dispatch group; and after reading said dispatch group, dynamically modifying the size of said dispatch group by changing the number of program instructions in said dispatch group to a number different than said first predetermined number, said dynamic modification comprises changing the predecoding after said dispatch group is read from said IBUF wherein said changing of said predecoding comprises activating a different of said Start bits to redefine said dispatch group.

2. The method of claim 1, wherein said dynamic modification is effected based on an analysis of events occurring downstream of said IBUF.

3. The method of claim 2, wherein said events occurring downstream of said IBUF comprise events that indicate the need to slow down the speed with which instructions are processed by said computer processor.

4. The method of claim 2, wherein said events include a resource conflict.

5. The method of claim 3, wherein said dynamic modification comprises the reduction of the number of instructions in said dispatch group.

6. The method of claim 5, wherein said dispatch group remains redefined for a predetermined period, and then reverts back to its state prior to being redefined.

7. A processor, comprising:

multiple hardware resources;

an Instruction Buffer (IBUF) storing one or more predecoded dispatch groups of program instructions, said dispatch group being predecoded prior to being read into said IBUF wherein said predecoding comprises the insertion of an inactive Start bit in each of said program instructions in said dispatch group, and activating one of said inactive Start bits to define the dispatch group; and a dispatch controller which controls the dispatch of program instructions to said hardware resources, said dispatch controller including:

an event detector for detecting certain events occurring during dispatch; and a trigger generator for triggering said IBUF to dynamically modify said dispatch group of program instructions after said program instructions have been read from said IBUF, based on events detected by said event detector, said dynamic modification comprises changing the predecoding after said dispatch group is read from said IBUF wherein said changing of said predecoding comprises activating a different of said Start bits to redefine said dispatch group.

8. The processor of claim 7, wherein said dynamic modification is effected based on an analysis of events occurring downstream of said IBUF.

9. The processor of claim 8, wherein said events occurring downstream of said IBUF comprise events that indicate the need to slow down the speed with which instructions are processed by said computer processor.

10. The processor of claim 8, wherein said events include a resource conflict.

11. The processor of claim 9, wherein said dynamic modification comprises the reduction of the number of instructions in said dispatch group.

12. The processor of claim 11, wherein said dispatch group remains redefined for a predetermined period, and then reverts back to its state prior to being redefined.

13. A computer program product for executing instructions in a computer processor, the computer program product comprising a computer-readable storage medium having computer-readable program code embodied in the medium, the computer-readable program code comprising:

first computer executable instructions for reading a dispatch group of program instructions from an Instruction Buffer (IBUF), said dispatch group comprising a first predetermined number of program instructions, said dispatch group being predecoded prior to being read into said IBUF wherein said predecoding comprises the insertion of an inactive Start bit in each of said program instructions in said dispatch group, and activating one of said inactive Start bits to define the dispatch group; and second computer executable instructions for dynamically modifying the size of said dispatch group after reading said dispatch group, by changing the number of program instructions in said dispatch group to a number different than said first predetermined number, said dynamic modifying comprising changing the predecoding after said dispatch group is read from said IBUF wherein said changing of said predecoding comprises activating a different of said Start bits to redefine said dispatch group.

14. The computer program product of claim 13, wherein said dynamic modification is effected based on an analysis of events occurring downstream of said IBUF.

* * * * *